US008423603B2

(12) United States Patent  (10) Patent No.: US 8,423,603 B2
Sohoni et al.  (45) Date of Patent: Apr. 16, 2013

(54) PROVIDING REAL TIME INFORMATION IN A VISUAL INFORMATION UNIT (75) Inventors: Sanjay V. Sohoni, Cupertino, CA (US); Mark Francis Interrante, Redondo Beach, CA (US); Brian Paul Channell, Redondo Beach, CA (US); Hu Pan, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 726 days.

(21) Appl. No.: 12/169,578

(22) Filed: Jul. 8, 2008

(65) Prior Publication Data

US 2008/0270921 A1 Oct. 30, 2008

Related U.S. Application Data (63) Continuation of application No. 11/643,068, filed on Dec. 20, 2006, now abandoned.

(51) Int. Cl.
G06F 15/16 (2006.01)

(52) U.S. Cl.
USPC .......................................... 709/203; 709/227

(58) Field of Classification Search .................. None
See application file for complete search history.

(56) References Cited

U.S. PATENT DOCUMENTS

| | | | | |
|---|---|---|---|---|
| 5,983,227 | A | * | 11/1999 | Nazem et al. ........................ 1/1 |
| 5,987,480 | A | * | 11/1999 | Donohue et al. ............... 715/207 |
| 6,195,651 | B1 | * | 2/2001 | Handel et al. ........................ 1/1 |
| 6,356,903 | B1 | * | 3/2002 | Baxter et al. .................. 707/702 |
| 2002/0023053 | A1 | * | 2/2002 | Szoc et al. ...................... 705/39 |
| 2002/0091762 | A1 | | 7/2002 | Sohn et al. |
| 2002/0194502 | A1 | * | 12/2002 | Sheth et al. .................... 713/201 |
| 2003/0117437 | A1 | | 6/2003 | Cook et al. |
| 2004/0068554 | A1 | | 4/2004 | Bales et al. |
| 2006/0026557 | A1 | | 2/2006 | Petri |
| 2006/0041637 | A1 | | 2/2006 | Jerrard-Dunne |
| 2006/0085520 | A1 | | 4/2006 | Allamaraju et al. |

FOREIGN PATENT DOCUMENTS

| | | |
|---|---|---|
| JP | 2003-132044 A | 5/2003 |
| JP | 2004-078844 A | 3/2004 |
| JP | 2006-185286 A | 7/2006 |
| KR | 10-2000-0030236 A | 6/2000 |

(Continued)

OTHER PUBLICATIONS

International Preliminary Report on Patentability mailed on Jul. 2, 2009, for PCT Application No. PCT/US2007/25906 filed on Dec. 17, 2007, 8 pages.

(Continued)

Primary Examiner — Peling Shaw
(74) Attorney, Agent, or Firm — James J. DeCarlo; Greenberg Traurig, LLP (57) ABSTRACT Embodiments of the invention enable a person to easily and without having any specialized knowledge configure a webpage to automatically provide real time information. More specifically, embodiments of the invention are directed to a remotely hosted element which may be easily configured and placed in a webpage by an un-sophisticated publisher. The remotely hosted element provides the real time information. In certain embodiments, the real time information is stock quotes, charts and associated news items. In certain embodiments, the real time information unit is interactive. In other words, it allows webpage viewers to interact with it in order to cause it to show additional, or differently organized information.

17 Claims, 6 Drawing Sheets

FOREIGN PATENT DOCUMENTS

| KR | 10-2006-006224 A | 1/2006 |
|---|---|---|
| KR | 10-2006-0070298 A | 6/2006 |
| TW | 486656 A | 5/2002 |

OTHER PUBLICATIONS

International Search Report and Written Opinion mailed on May 26, 2008, for PCT Application No. PCT/US07/25906 filed on Dec. 17, 2007, 12 pages.

Decision for Refusal issued on Oct. 31, 2011 in Japanese Patent Appln. No. 2009-542886.

Notification of Reason(s) for Refusal issued on May 30, 2011 in Japanese Patent Appln. No. 2009-542886.

Kasai, "Creation of Application Using Visual Web Developer Express, and Setup for Atlas and ClickOnce", Windows Developer Magazine, vol. 12, No. 9, pp. 67-68, Japan, SOEI Corp., Jul. 1, 2006.

Hono, "Only 15 Minutes for Beginners to Complete a Free Blog", YOMIURI PC, Japan, YOMIURI Press, Oct. 26, 2006, vol. 11, No. 12, pp. 50-51.

Kurausu, "Slog Parts", I/O, Japan, Engineering, Inc., Feb. 23, 2006, vol. 31, No. 3, pp. 122-123.

Masui, "2006Virsion Recommendation for EC Sites to be Successful in Golden Days of CGM/RSS", Web Site Expert No. 06, Japan, Technology Critic Inc., Apr. 25, 2004, pp. 55-61.

Furuhata, "How to Use Free Ajax Parts", Ajax Library Guide, Source & Script Actumn 2006, Japan, Mainichi Communication Inc., Dec. 12, 2006, pp. 106-139.

Supplementary Search Report ( EP 07 86 3101) dated Apr. 27, 2012; 2 pages.

\* cited by examiner

PROVIDING REAL TIME INFORMATION IN A VISUAL INFORMATION UNIT

CROSS-REFERENCE TO RELATED APPLICATION

This application is a continuation of U.S. patent application Ser. No. 11/643,068 filed Dec. 20, 2006, which is incorporated herein by reference.

BACKGROUND OF THE INVENTION

The popularity of the Internet has caused many people to create websites and webpages. A person that has created, owns, administers, or otherwise controls a webpage or a website will be hereinafter referred to as a webpage publisher or publisher. Simple webpages usually consist of a single HTML file whose content stays constant until the webpage publisher "manually" changes it. However, more complex websites and webpages may be designed to provide real time information. Such webpages are configured to display "dynamic" content or to automatically change their content without explicit involvement from the publisher or any other person.

Dynamic webpages are usually very complex. In order to automatically provide new content in real time, they usually require complex software which periodically accesses various databases and modifies the content of the webpage according to the accessed data. Thus, a webpage may automatically provide information about the world in real time by continuously accessing changing databases of that information. The real time information may be, for example, stock quotes.

An important development in the popularization of the Internet is the emergence of the amateur webpage publisher. That is, persons without deep or professional knowledge of web programming have been able to start and maintain various webpages or websites. Basic HTML authoring tools have made webpage creation accessible to persons with little or no knowledge of HTML. Furthermore, there are websites such as BLOGGER.COM which allow users to create webpages very easily, without having any knowledge of HTML.

However, the amateur web publisher usually does not have sufficient knowledge of databases and automatic content creation to create webpages which change their content automatically (dynamic webpages).

Remotely hosted elements are elements of a webpage which are not provided as part of the webpage from the computer that hosts that webpage. Instead, the remotely hosted element is hosted by another computer. That other computer is usually controlled by a different entity than the one controlling the webpage. The webpage includes a reference to the remotely hosted element. When a browser displays the webpage, it notes the reference and uses it to access the other computer and retrieve the remotely hosted element.

Most known remotely hosted elements are advertisements. The advertisements may change over time, i.e. a different advertisement may be displayed after each webpage reload. However, advertisements are usually manually prepared before hand. Therefore, advertisements do not provide real time information.

Another type of remotely hosted element is a search box. A search box is a field which allows a viewer of the webpage to send web search requests to remotely hosted search engines. The search box itself usually provides no real time information.

What is needed is a way to allow a person that does not have the knowledge, ability or desire to deal with the complexities of generating dynamic content to configure his/her webpage so that it automatically provides real time information.

BRIEF SUMMARY OF THE INVENTION

Embodiments of the invention enable a person to easily and without having any specialized knowledge configure a webpage to automatically provide real time information.

More specifically, embodiments of the invention are directed to a remotely hosted element which may be easily configured and placed in a webpage by an unsophisticated publisher. The remotely hosted element provides the real time information. In certain embodiments, the real time information may include stock quotes, charts and associated news items.

In certain embodiments, the real time information unit is interactive. In other words, it allows webpage viewers to interact with it in order to cause it to show additional or differently organized information. In certain embodiments, the real time information unit can be placed in a visual information unit other than a webpage.

DETAILED DESCRIPTION OF THE INVENTION

While various embodiments of the invention may be configured to provide different types of information, the embodiments discussed herein provide mostly stock prices and other financial information. Financial information, although merely representative of various embodiments, is an appropriate illustrative choice because financial information embodiments represent an existing market need and furthermore, financial information is convenient to use in the context of the invention as many existing databases of financial information are available.

The invention is described below with reference to webpages. However, persons of skill in the art would recognize that the invention may not be limited to webpages but is applicable to any visual information unit. A visual information unit is any set of information which is configured to be at least partially visually represented to a user. In addition to visual information, the visual information unit may also include audio or video information.

Figure 1:
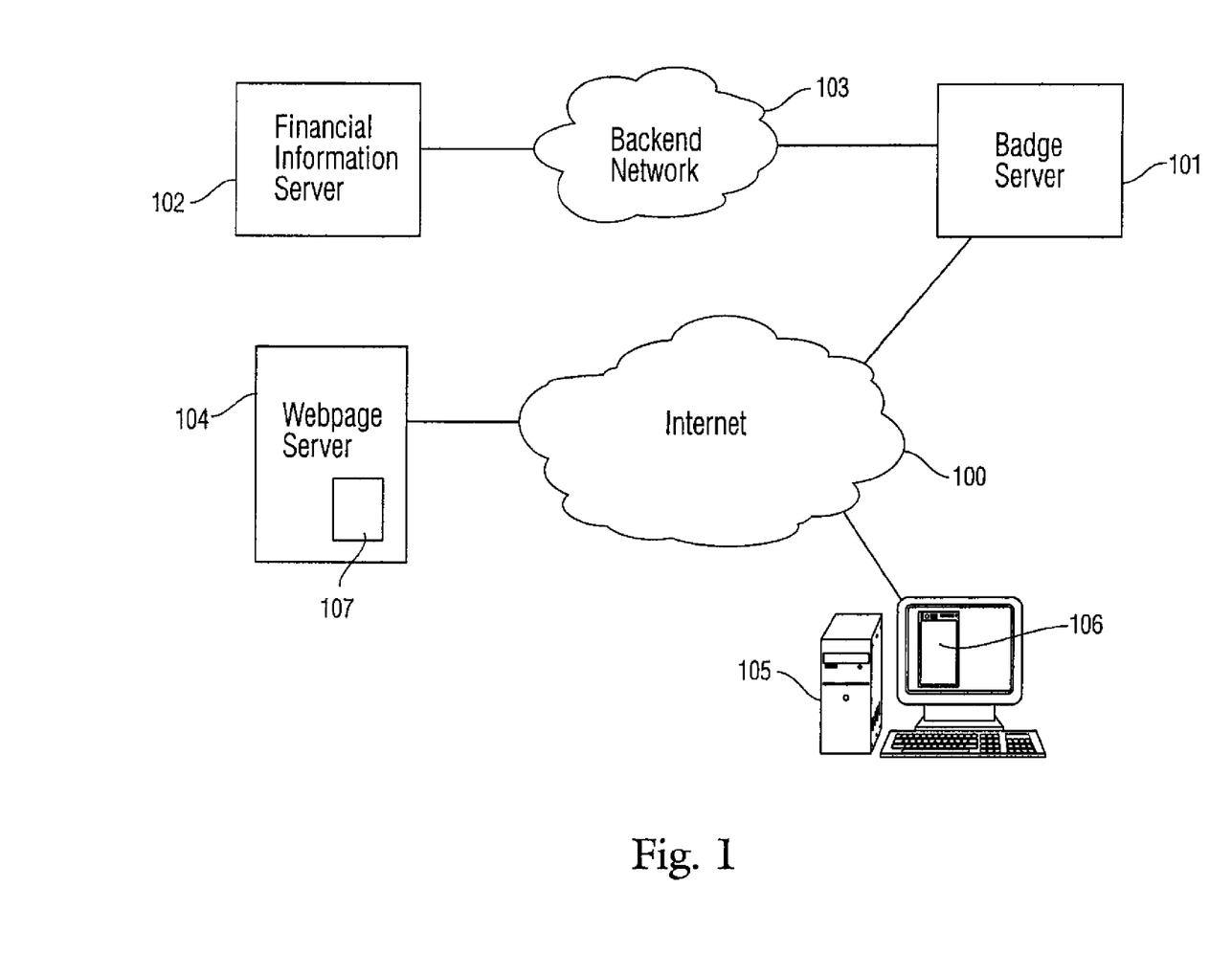
FIG. 1 is a diagram of an overall environment of operation of embodiments of the invention.

FIG. 1 shows an overall environment in which the invention operates. A financial information server 102 is a backend server that provides raw financial data. This server usually includes a database which holds financial data. The financial data may include prices of various securities or other traded elements (commodities, currencies, contracts, indices, rates, scores etc., hereinafter also referred to as securities). Furthermore, the financial data may include graphs of the aforementioned securities. The financial data may also include articles (such as, for example, news articles, blogs, editorials, columnist articles, message board posts, etc.) about financial matters. Each article may be associated with one or more securities.

The badge server 101 creates and provides the remotely hosted element of the invention. The remotely hosted element may be referred to as a badge. The badge server creates the remotely hosted element based on data provided from the financial information server and configuration parameters provided from a publisher who has included the remotely hosted element in his/her website.

In some embodiments, the financial information server 102 and the badge server 101 are controlled by the same entity. In these embodiments, the financial information server and the badge server are connected through a backend network 103. The backend network is a network which is not publicly accessible but limited to the entity that controls these servers. Usually, the back end network is configured to be faster than the ordinary public networks. In alternative embodiments, the backend network may be any network, including the Internet 100.

The webpage server 104 is a server that provides a webpage or website 107 that is configured to take advantage of the invention. In other words, the publisher of the webpage 107 has included the remotely hosted element (or badge) of the present invention into the webpage 107. Thus, the publisher is a user of the invention.

An end user may utilize a computer 105 which includes a browser 106 to view webpage 107. The end user is a person that views a webpage; he need not have participated in the design of the webpage 107. The end user views the badge as part of the webpage 107, and may further interact with the badge.

The end user's browser 106 obtains some or most of the webpage 107 from the webpage server 104 through the Internet 100. The browser then obtains the badge from the badge server 101. The browser may then display the entire webpage 107 to the user by combining the portions obtained from the webpage server 104 with the badge obtained from the badge server. The end user then benefits from the badge by viewing the information on there and/or interacting with the badge to obtain more information.

A person of skill in the art would recognize that the internet 100 may be another network, such as an intranet, a LAN, a wireless network, etc.

Figure 2A:
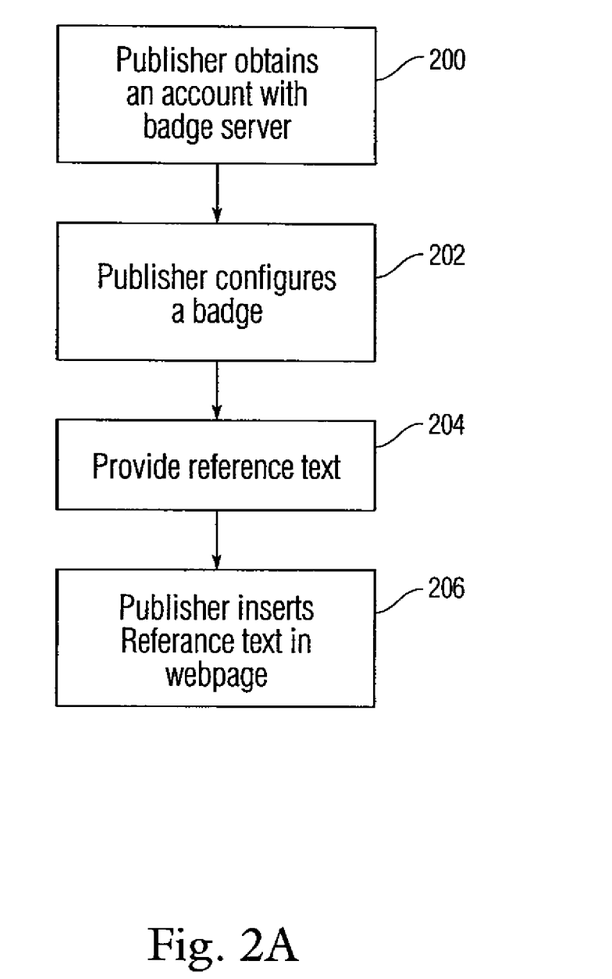
FIGS. 2A and 2B are flowcharts showing a method of operation of an embodiment of the invention.
Figure 2B:
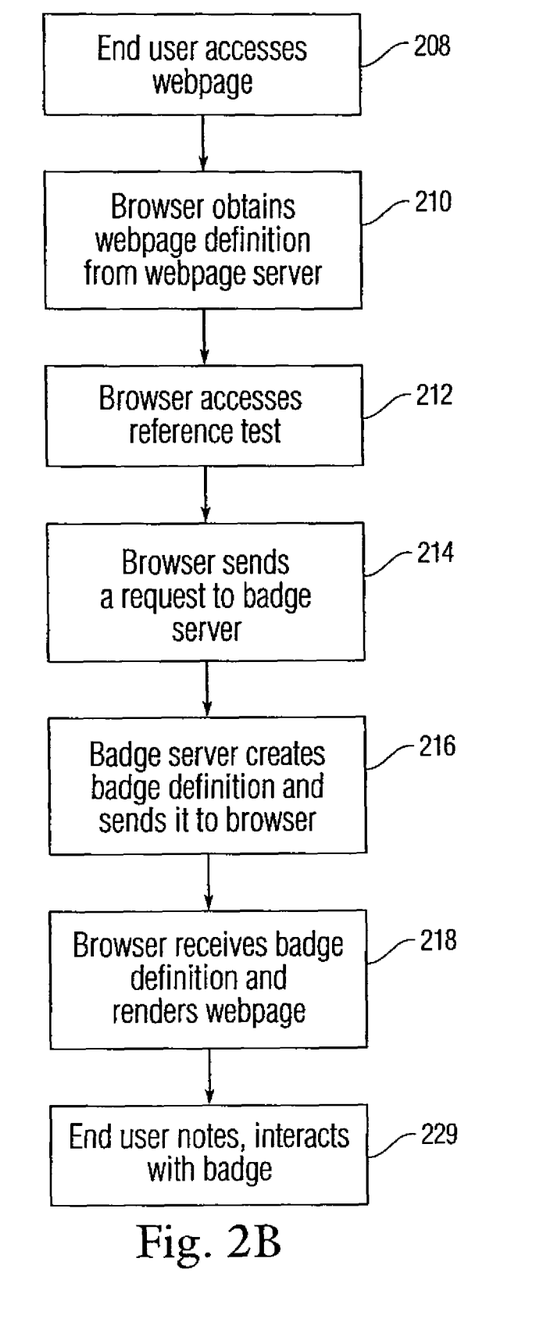

FIGS. 2A and 2B are flowcharts showing a method of operation of an embodiment of the invention. FIG. 2A shows the configuration of a badge, while FIG. 2B shows the process of display or use of a badge.

Referring to FIG. 2A, at step 200 a publisher obtains an account with a service associated with the invention (referred to as a badge service). This step is optional. Requiring publishers to obtain accounts may have various benefits, as it allows information for specific publishers to be tracked by the badge service. The account need not be limited to the badge service but may be a general account associated with multiple services.

At step 202, the publisher configures a badge. The configuration specifies the overall appearance of the badge as well as the information provided by it. For example, the publisher may choose from the following types of information: stock quotes, stock charts, quotes and charts for other securities, and news items. If choosing to display charts, the publisher may choose the time period over which the charts should be displayed. The publisher may also choose the number of news items to be displayed. If charts are to be displayed, the publisher may choose whether they are to be displayed in an overlaid comparison fashion or as separate graphs.

The publisher may choose various options pertaining to the overall organization of the displayed information. The publisher may also choose the size and the color scheme of the badge.

The publisher may perform step 202 by interacting with a configuration website associated with the badge service. The website may be provided by badge server 101 or another server. While the publisher is performing various configuration choices, the configuration website may dynamically show what a badge created according to the publisher's currently selected choices would look like.

At step 204, the badge service provides the publisher with badge reference text. The badge reference text is meant to be inserted into the definition of a webpage, such as webpage 107, in order to cause the badge to be displayed by a browser rendering that webpage (such as browser 106). An example of the reference text is shown in appendix A.

The reference text may be an HTML inline frame (iframe) definition as shown in Appendix A. An HTML inline frame allows one to embed an HTML document into another HTML document. Thus, the badge may be defined as an HTML document and embedded into a parent HTML document, such as webpage 107. As discussed below the inline frame may include JAVASCRIPT or FLASH code. Alternatively, the reference text may be an applet (such as, e.g., a JAVASCRIPT or a FLASH applet) or a reference to an applet, which is placed directly into the webpage without using an inline frame.

The reference text includes a reference to the badge server 101 which will provide the actual HTML definition of the badge. The reference text may also include text describing the various configuration options chosen by the publisher. For example, the reference text shown in Appendix A describes the width and height of the badge (200 pixels, and 714 pixels, respectively), the symbols of the securities shown by the badge (YHOO, F, and AMD) the choice that the securities should be shown in comparison fashion (i.e., with the graphs being super imposed), the choice that the chart should be for a one year period, the choice of a white color scheme, the choice that three news items should be displayed, etc.

When the reference text is created, the badge service may create a record associated with the badge, assign a unique identification to that record and store the record at the badge server 101. The reference text may thus include the unique identification associated with the badge as well as the account name of the publisher that configured the badge or a unique identification associated with that name. For security purposes these two elements of the reference text may be encrypted.

In an alternative embodiment, the reference text may not include any of the configuration parameters discussed above. Instead it may only include the unique identification of the badge record and, optionally, of the publisher's account. The configuration options may be stored as part of the badge record at the badge server 101.

At step 206, the publisher inserts the reference text in the webpage in which the publisher wishes to place a badge (such as, webpage 107). In accordance with known HTML rules, by placing the reference text in specific places in the webpage definition, and/or placing additional "tags" associated with the reference text, the publisher may define the position of the badge within the webpage.

At this point, the badge is configured. FIG. 2B shows the method of display of the configured badge in ordinary course of use of an embodiment of the invention. At step 208, the end user accesses the webpage which includes the reference text (such as webpage 107) through a browser, such as browser 106. At step 210, the browser obtains the webpage definition of the webpage from the webpage server.

Having obtained the webpage definition, the browser accesses the reference text (step 212). Based on a reference to the badge server in the reference text, the browser sends a request to the badge server in step 214. The request includes portions of the reference text which list the configuration options and identifying information discussed above.

At step 216, the badge server creates a badge definition and sends it back to the browser. The badge definition is created by referring to the configuration options received in the request and querying the financial information server for financial data which may be used to create charts, provide quotes and headlines for news stories. The news stories may be news stories which refer to the securities which the badge is configured to show. The badge definition may be in HTML format. Furthermore, the badge definition may include code, such as JAVASCRIPT or FLASH code which may provide advanced interactivity features.

At step 218, the browser receives the badge definition and renders the webpage, including the badge. The badge may be rendered as an inline frame within the webpage.

At step 220, the end user views the badge and the real time information contained therein. The end user may interact with the badge in order to view additional information.

In various embodiments, the badge may allow for several types of end user interaction. For example, the end user may be allowed to click on links within the badge in order to cause the browser to display another webpage related to a link. More specifically, an end user may click on a news story headline and cause the browser to bring up the entire news story. Alternatively, the end user may click on one of the displayed securities and obtain a webpage describing that security in detail. Furthermore, the end user may use a text entry field in the badge in order to enter the symbol for another security and to view a webpage describing that security in detail.

Another type of end user interaction refers to interactions which do not cause a new webpage to be displayed but merely cause changes in the badge itself. For example, a badge which is configured to show individual charts may show only a single chart which refers to a single security at a time and show other securities in quote format. An end user may click on one of the quotes for the other securities to cause the badge to show a chart for that particular security. Similarly, a badge configured to show multiple securities and news headlines may only show news stories related to one security. A user may then click on the badge to obtain headlines about other securities.

Figure 3:
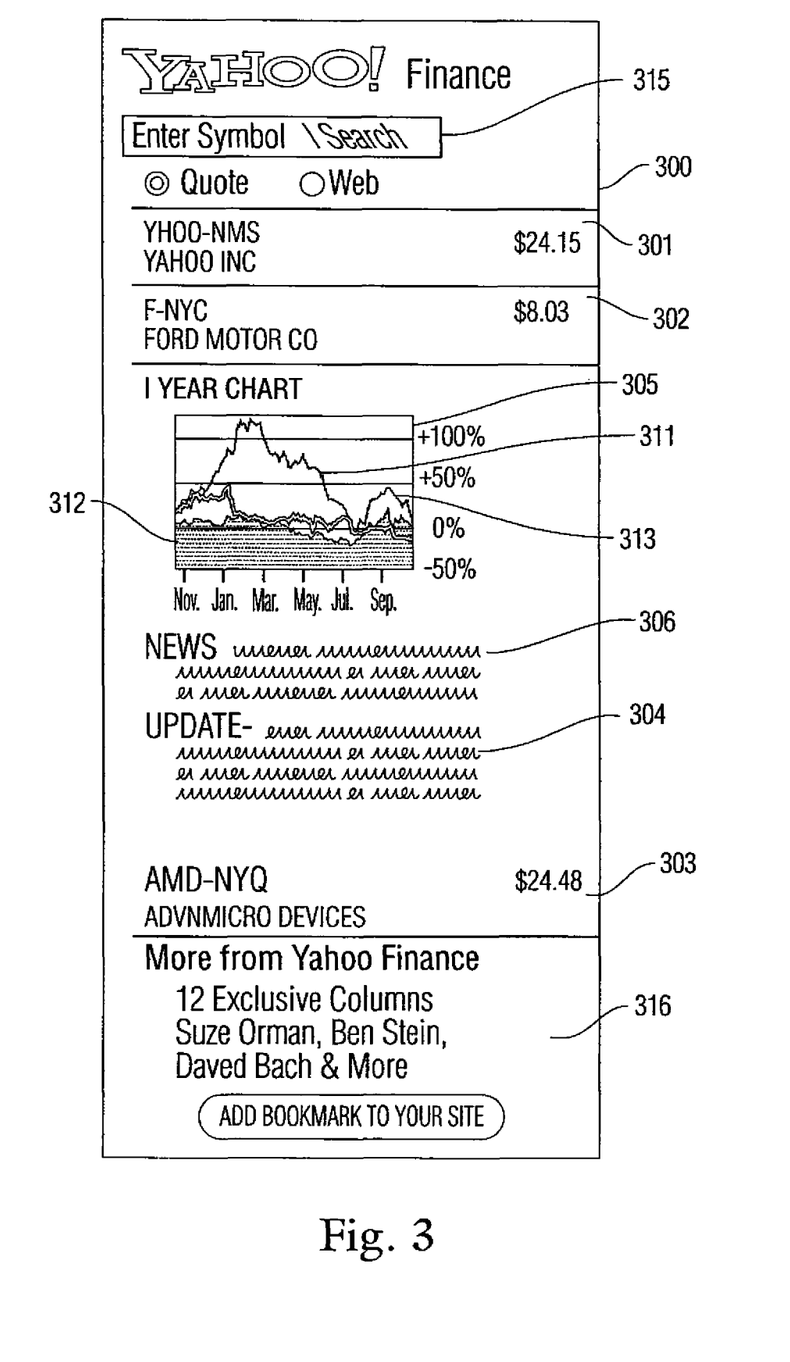
FIG. 3 is a diagram of an example badge according to embodiments of the present invention.

FIG. 3 is a diagram of an example badge 300 according to embodiments of the present invention. The badge shown in FIG. 3 is defined by the reference text included in Appendix A. It can be seen that the badge includes three quotes, quote 302 for FORD MOTOR CO. (symbol F), quote 301 for Yahoo (symbol YHOO) and quote 303 for ADVANCED MICRO DEVICES (symbol AMD). The quotes include prices, expanded company names as well as additional optional information (such as the name of the exchange where they are traded).

In the embodiment illustrated in FIG. 3 each one of the quotes may be expanded to provide additional information about the company. The additional information is placed in detailed information field 304. An end user may expand a quote by clicking on it in the badge. In FIG. 3, the Ford quote is expanded.

The additional information in the detailed information field may include a chart 305 as well as one or more news story headlines 306. The one or more news story headlines may be related to the security with which the detailed information field is associated (i.e., Ford).

The chart may include a chart of a single security (the one with which the detailed information field is associated with) or, if the comparison chart option is chosen, the chart may include multiple superimposed graphs each being associated with one of the securities displayed by the badge. Accordingly, the chart 305 includes graphs 311, 312, and 313 which are associated with the YAHOO, FORD and AMD securities, respectively. However, even in comparison mode the graph of the currently selected security (or, in other words, the security with which the detailed information field is associated, in this case, FORD) may be displayed in a different fashion (here it is displayed by filling in the area below the graph with solid color) in order to underscore that security's selected status.

As discussed above, the end user may select another security by clicking on its quote, or click on one of the news headlines to obtain an entire news story.

Additional features of the badge 300 may include a search field 315 which may allow an end user to enter additional symbols for additional securities. The entered symbol may be displayed in a new webpage, or alternatively, the entered symbol may be added to the quotes currently displayed by the badge. The code defining the badge may perform ticker validation when the user enters a new security in the search field. Thus, the badge may determine whether such a security exists, or even display the full name of the security when the user is entering the name of the security's symbol to ensure that the user is entering the correct security. The badge may also include an advertisement 316.

Alternative embodiments may provide a badge with different or additional features than badge 300. For example, there may be functionality provided to modify the time period of the charts.

Figure 4:
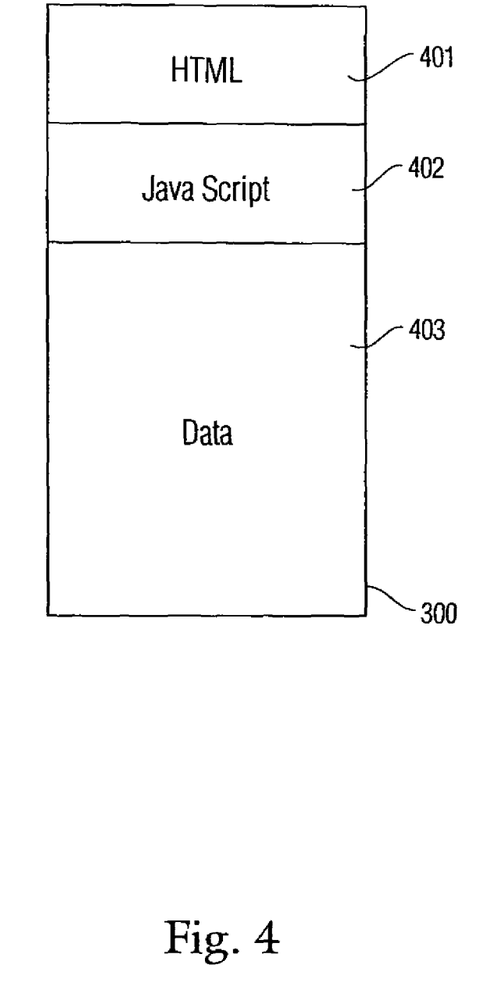
FIG. 4 is a conceptual diagram of the electronic representation of a badge according to an embodiment of the present invention

FIG. 4 is a conceptual diagram of the electronic representation of the badge 300 according to an embodiment of the present invention. The badge may be organized as an HTML document which is retrieved and rendered within an inline frame (iframe) defined by the reference text.

The badge may include some HTML code 401 which may define the overall structure of the badge, some background colors, some border elements, and some other features which do not require high level of interactivity. In some embodiments, features of the badge that have no interactivity or only include links to other webpages (such as, e.g., advertisement 316) are defined in the HTML portion of the badge. The HTML portion further includes a reference to executable code 402 which defines the features of the badge which require a higher level of interactivity. In other words, the executable code may define features which may be dynamically changed by interaction from the user, such as, e.g., the quotes 301-303, the detailed information field 304 and its contents, the chart 305, etc.

The executable code 402 may be a JavaScript application. The application 402 receives information defining clicks from the user and changes the badge accordingly and dynamically. For example, if a user clicks on the YAHOO quote 301, the application may note that click and modify the detailed information field so that it is placed directly under the YAHOO quote and so that it shows news headlines referring to YAHOO. The application may further modify the stock chart 305, so that the YAHOO graph is underscored.

The badge definition further includes data 403. The data may include price data for the various securities included in the badge which may be used by the application 402 to display quotes or to draw graphs. The data may further include headlines for news stories, etc. The application 402 accesses the data 403 as needed in order to display elements of the badge. For example, if the end user chooses another security, the application 402 may access the data 403 to obtain news headlines for that other security.

In some embodiments, the application 402 may access the badge server 101 in order to obtain additional data needed to display needed elements of the badge. For example, referring to FIG. 3, the initial download of the badge may not include any news headlines for AMD. If the user consequently selects AMD, the application 402 may access badge server 101 to obtain these headlines.

Because the reference text that causes the badge to be requested and retrieved may include unique identifiers of the publisher which created a particular badge as well as the badge itself the operator of the badge server may use this information to gather potentially valuable data regarding the use badges. For example the badge server 101 may keep track of which publishers select which badges, at which webpages badges are placed, which badges are popular with users, etc. Furthermore, since a webpage including a badge usually causes the badge to be requested each time the webpage itself is requested, the badge server 101 may gather data as to how often the various webpages which include badges are visited. The gathered data may also be provided to the publisher.

When a browser requests a badge from the badge server, the usual HTTP protocol requires that the browser also include a reference to the webpage for which the badge is being requested. This may assist the badge server in logging information about badge use. Furthermore, the badge server may retrieve the webpage which includes the badge before sending the badge over to the browser in order to check the webpage for any inappropriate content. The badge server may then refuse to send the badge to the browser, if the webpage where the badge is placed includes any inappropriate content. Thus, the operator of the badge server 101 may protect its brand name, assist in ensuring decency online or achieve other goals by limiting the webpages in which the badge may be included.

Referring back to FIG. 1, it is noted that in some embodiments, the definition of the badge is stored as part of the reference text, which is itself part of the definition of a webpage 107 stored at the webpage server 104. Thus, the publisher, who is presumably in control of the webpage 107, may change the definition of the badge by modifying the reference text. In some embodiments, modifying the reference text in such a manner may be discouraged, or even prohibited.

However, some embodiments may benefit from the publisher's ability to modify the reference text. More sophisticated publishers may automatically modify the reference text in order to match updates to other content of webpage 107. For example, if a publisher uses webpage 107 to provide financial stories, the publisher may place a script, or an application at website server 104 which scans the current content of any stories at webpage 107 for any mentions of traded companies or other traded items, and automatically updates the reference text to include the symbols of the mentioned traded items. Thus, when the badge is displayed as part of webpage 107, it will include information regarding the companies or other traded items discussed in the news story.

While the invention has been described in terms of particular embodiments and illustrative figures, those of ordinary skill in the art will recognize that the invention is not limited to the embodiments or figures described. Although embodiments of the present invention are described, in some instances, using World Wide Web terminology, those skilled in the art will recognize that such terms are also used in a generic sense herein, and that the present invention is not limited to such systems.

Those skilled in the art will recognize that the operations of the various embodiments may be implemented using hardware, software, firmware, or combinations thereof, as appropriate. Furthermore, a person of skill in the art would recognize that for each embodiment which is implemented through software there may be a respective embodiment directed to a modulated signal which includes said software. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

The term "real time" has been used throughout the present disclosure in connection with the terms "information" or "data." It should be noted that the term "real time" does not impose any strict time related requirement for the corresponding data or information. Thus, real time may indicate that the data or information may reflect events that happened seconds, minutes, hours, or even days ago. For example, publicly available financial information is usually published on the internet with a delay of at least 15 minutes. This information would certainly be considered to be real time for the purposes of the present disclosure. But information that is much older than that may also be considered real time. In general, the term real time requires that the respective information be time sensitive to a certain extent, so that the automatic update features disclosed herein are beneficial to web publishers.

Figure 5:
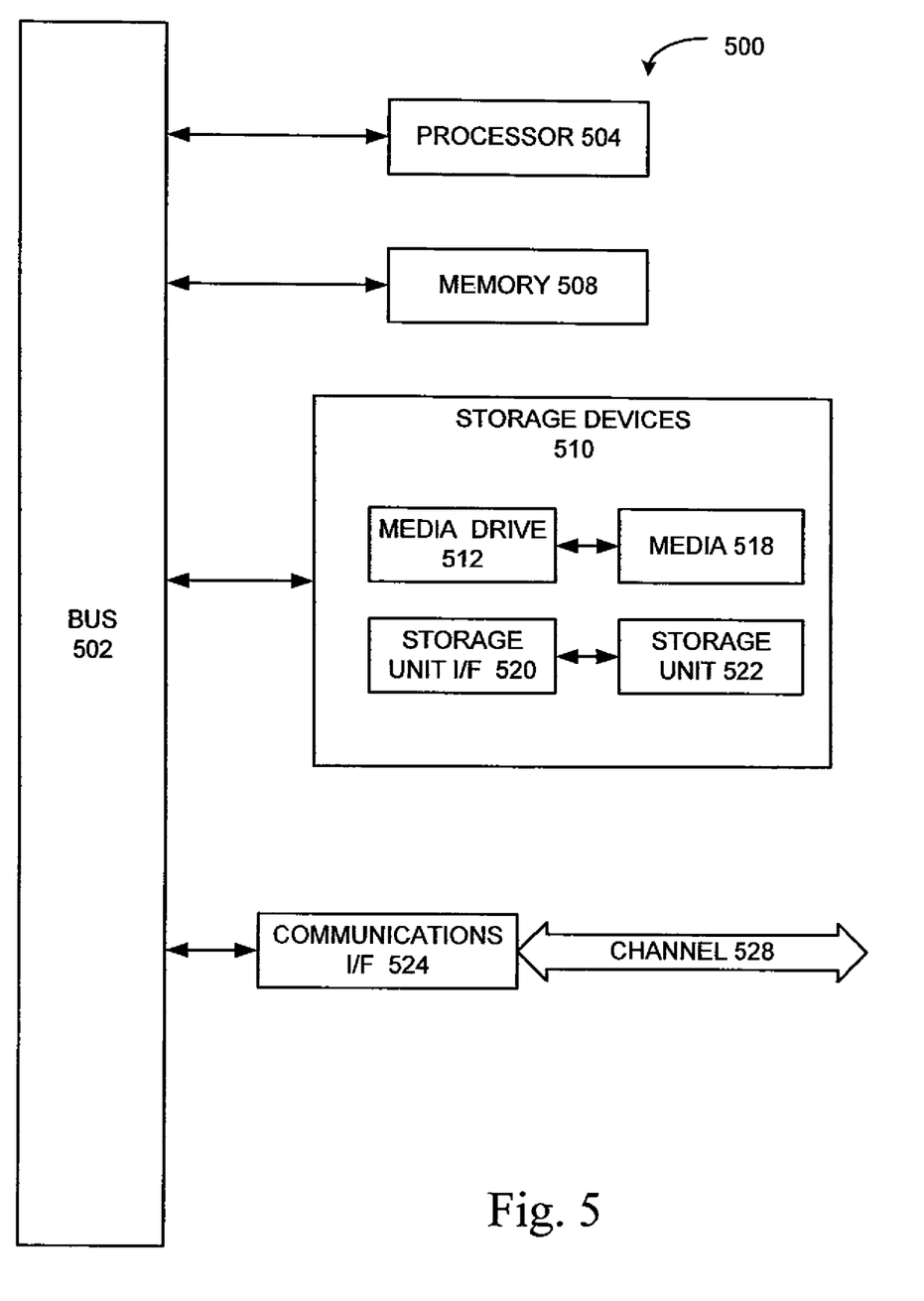
FIG. 5 illustrates a computer system that may be employed to implement embodiments of the invention.

FIG. 5 illustrates a typical computing system 500 that may be employed to implement processing functionality in embodiments of the invention. Computing systems of this type may be used in the various servers, and the end user's computer, for example. Those skilled in the relevant art will also recognize how to implement the invention using other computer systems or architectures. Computing system 500 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 500 can include one or more processors, such as a processor 504. Processor 504 can be implemented using a general or special purpose processing engine such as, for example, a microprocessor, microcontroller or other control logic. In this example, processor 504 is connected to a bus 502 or other communications medium.

Computing system 500 can also include a main memory 508, such as random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory ("ROM") or other static storage device coupled to bus 502 for storing static information and instructions for processor 504.

The computing system 500 may also include information storage system 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 518, may include, for example, a hard disk, floppy disk, magnetic tape, optical disk, CD or DVD, or other fixed or removable medium that is read by and written to by media drive 514. As these examples illustrate, the storage media 518 may include a computer-readable storage medium having stored therein particular computer software or data.

In alternative embodiments, information storage system 510 may include other similar components for allowing computer programs or other instructions or data to be loaded into computing system 500. Such components may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other NIC card), a communications port (such as for example, a USB port), a PCMCIA slot and card, etc. Software and data transferred via communications interface 524 are in the form of signals which can be electronic, electromagnetic, optical or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 508, storage device 518, or storage unit 522. These and other forms of computer-readable media may store one or more instructions for use by processor 504, to cause the processor to perform specified operations. Such instructions, generally referred to as "computer program code" (which may be grouped in the form of computer programs or other groupings), when executed, enable the computing system 500 to perform functions of embodiments of the present invention.

Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 500 using, for example, removable storage drive 514, drive 512 or communications interface 524. The control logic (in this example, software instructions or computer program code), when executed by the processor 504, causes the processor 504 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

APPENDIX A (example of reference text)

```
<!-- Start of Yahoo! Finance code -->
<iframe allowtransparency="true" marginwidth="0" marginheight="0" hspace="0"
vspace="0" frameborder="0" scrolling="no"
src="http://api.finance.yahoo.com/instrument/1.0/YHOO,F,AMD/badge;chart=1y,,comp
arison;news=3;quote/HTML/f.white?AppID=CQRTGrimDnW.GjspC2vDI8fUew__rTg--
&sig=tRYQcb3IQlzkRxU9Lb.JB__4ytp0-&t=1161144492791" width="200px"
height="700px"></iframe>
<!-- End Yahoo! Finance code -->
```

What is claimed is:

1. A method comprising:
    receiving, by a web server, a reference text associated with a remotely hosted element including dynamic content, the remotely hosted element hosted by a badge server different than the web server;

transmitting, by the web server, a web page to a user, the web page comprising the reference text;
receiving, by the web server, changes to one or more configuration options of the remotely hosted element by the user of the user computer;
modifying, by the web server, the reference text according to the changed configuration options;
receiving, by the web server, a preferred configuration of the remotely hosted element from the user of the user computer; and
storing, by the computing device, the preferred configuration in the reference text, the reference text being such that, when included in a definition of a second webpage, would cause the second webpage to display the remotely hosted element including the dynamic content, as configured by the user in the preferred configuration.

2. The method of claim 1, wherein storing the preferred configuration includes storing the preferred configuration in a database.

3. The method of claim 1, further including placing the reference text within the definition of the second webpage.

4. The method of claim 3, further including:
accessing a first server by a web browser to obtain the definition of the second webpage including the reference text;
accessing the badge server based on the reference text by the web browser in order to obtain a definition of the remotely hosted element;
displaying the second webpage by the web browser based on the webpage definition; and
displaying within the second webpage, the remotely hosted element based on the definition obtained from the badge server.

5. A server system comprising:
a processor; and
a storage medium for tangibly storing thereon program logic for execution by the processor, the program logic configured to cause the processor to:
receive a reference text associated with a remotely hosted element including dynamic content, the remotely hosted element hosted by a badge server different than the web server;
transmit, by the web server, a web page to a user computer, the web page comprising the reference text;
transmit an interface for display at the webpage, the interface being configured to allow the user to change one or more configuration options of the remotely hosted element through the webpage;
receive modifications of the displayed remotely hosted element according to the changed configuration options;
receive a preferred configuration of the remotely hosted element through the webpage;
store the preferred configuration in the reference text; and
transmit to the user the reference text, the reference text being such that, when included in the definition of a second webpage, would cause the second webpage to display the remotely hosted element including the dynamic content, as configured by the user in the preferred configuration.

6. The system of claim 5, wherein storing the preferred configuration includes storing the preferred configuration in a database.

7. The system of claim 5, wherein the computer executable instructions are further configured to cause the processor to:
receive a request from an external server for a definition of the remotely hosted element, the request including the reference text;
compose the definition of the remotely hosted element based on the reference text and dynamic data; and
send the definition of the remotely hosted element to the external server.

8. A non-transitory computer readable storage medium, comprising computer executable instructions configured to cause a processor to:
receive, by the processor, a reference text associated with a remotely hosted element including dynamic content, the remotely hosted element hosted by a badge server different than the processor;
provide a webpage displaying the remotely hosted element including dynamic content;
receive changes to one or more configuration options of the remotely hosted element through the webpage;
change the displayed remotely hosted element according to the changed configuration options;
receive a preferred configuration of the remotely hosted element through the webpage;
store the preferred configuration in a reference text; and
provide the user with the reference text, the reference text being such that, when included in the definition of a second webpage, would cause the second webpage to display the remotely hosted element including the dynamic content, as configured by the user in the preferred configuration.

9. The non-transitory computer readable storage medium of claim 8, wherein storing the preferred configuration includes storing the preferred configuration in a database.

10. The non-transitory computer readable storage medium of claim 8, wherein the computer executable instructions are further configured to cause the processor to:
receive a request from an external server for a definition of the remotely hosted element, the request including the reference text;
compose the definition of the remotely hosted element based on the reference text and dynamic data; and
send the definition of the remotely hosted element to the external server.

11. A method comprising:
receiving, at a web server, a reference text associated with a remotely hosted element including dynamic content, the remotely hosted element hosted by a badge server different than the web server;
displaying, by the web server, the remotely hosted element including dynamic content at a webpage;
receiving, by the web server from a user, instructions to change one or more configuration options of the remotely hosted element;
modifying, by the web server, the displayed remotely hosted element according to the changed configuration options;
receiving, by the web server, an indication from the user that a current configuration of the remotely hosted element is a desired configuration;
storing, by the web server, the desired configuration in a reference text;
providing, by the web server, the user with the reference text;
receiving, by the web server, a request from a browser software, the request including the reference text;
obtaining, by the web server, the desired configuration of the remotely hosted element based on the reference text; and
sending, by the web server to the browser software, data describing the remotely hosted element in the desired configuration.

12. The method of claim 11, wherein storing the desired configuration includes storing the preferred configuration in a database and obtaining the desired configuration includes performing a database search for the desired configuration based on the reference text or a portion thereof.

13. The method of claim 11, wherein obtaining the desired configuration includes extracting the desired configuration from the reference text.

14. The method of claim 11, further including providing the user with instructions to copy the reference text to a second webpage.

15. The method of claim 14, wherein the request from the browser software is issued by the browser software as a result of processing by the browser software of the second webpage that includes the reference text.

16. A server comprising:
a processor;
a storage medium for tangibly storing thereon program logic for execution by the processor, the program logic comprising logic for:
receiving, by a web server, a reference text associated with a remotely hosted element including dynamic content, the remotely hosted element hosted by a badge server different than the web server;
transmitting, by the web server, a web page to a user, the web page comprising the reference text;
receiving from the user instructions to change one or more configuration options of the remotely hosted element;
modifying the displayed remotely hosted element according to the changed configuration options;
receiving an indication from the user that a current configuration of the remotely hosted element is a desired configuration;
storing the desired configuration in the reference text;
transmitting, to the user, the reference text;
receiving a request from a browser software, the request including the reference text;
obtaining the desired configuration of the remotely hosted element based on the reference text; and
sending to the browser software data describing the remotely hosted element in the desired configuration.

17. A non-transitory computer readable storage medium, comprising computer executable instructions configured to cause a processor to:
receive a reference text associated with a remotely hosted element including dynamic content, the remotely hosted element hosted by a badge server different than the web server;
transmit, by the web server, a web page to a user, the web page comprising the reference text;
receive from the user instructions to change one or more configuration options of the remotely hosted element;
modify the displayed remotely hosted element according to the changed configuration options;
receive an indication from the user that a current configuration of the remotely hosted element is a desired configuration;
store the desired configuration in a reference text;
transmit, to the user, the reference text;
receive a request from a browser software, the request including the reference text;
obtain the desired configuration of the remotely hosted element based on the reference text; and
send to the browser software data describing the remotely hosted element in the desired configuration.

* * * * *